INVENTOR
Walter J. Krupick
ATTORNEY

Oct. 21, 1958 W. J. KRUPICK 2,856,777
FLOATED GYRO
Filed Nov. 5, 1956 7 Sheets-Sheet 2

INVENTOR.
Walter J. Krupick
BY
ATTORNEY

Oct. 21, 1958  W. J. KRUPICK  2,856,777
FLOATED GYRO

Filed Nov. 5, 1956  7 Sheets-Sheet 3

INVENTOR.
Walter J. Krupick
BY
ATTORNEY

INVENTOR.
Walter J. Krupick
BY
ATTORNEY

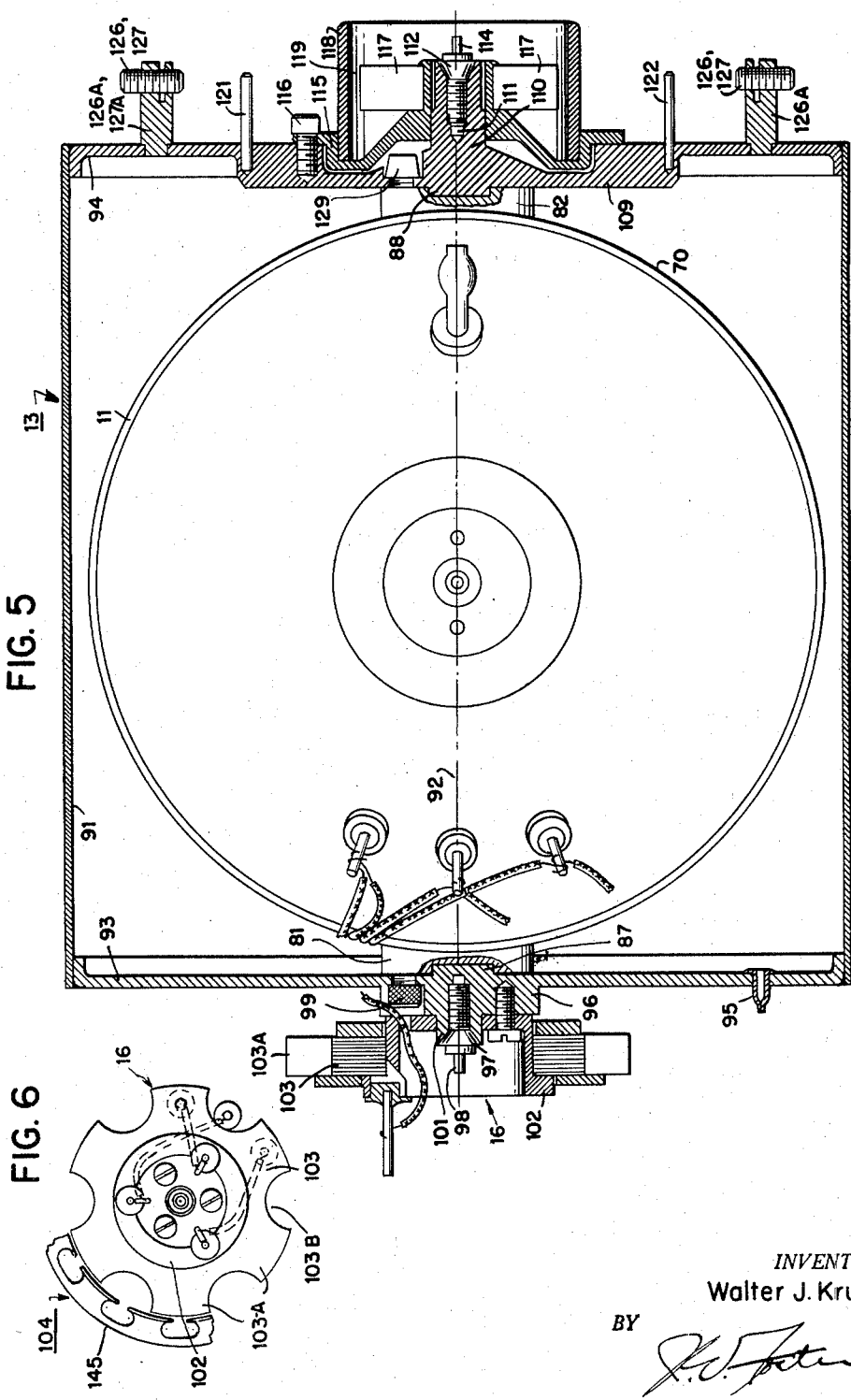

Oct. 21, 1958  W. J. KRUPICK  2,856,777
FLOATED GYRO
Filed Nov. 5, 1956  7 Sheets-Sheet 6
FIG. 7
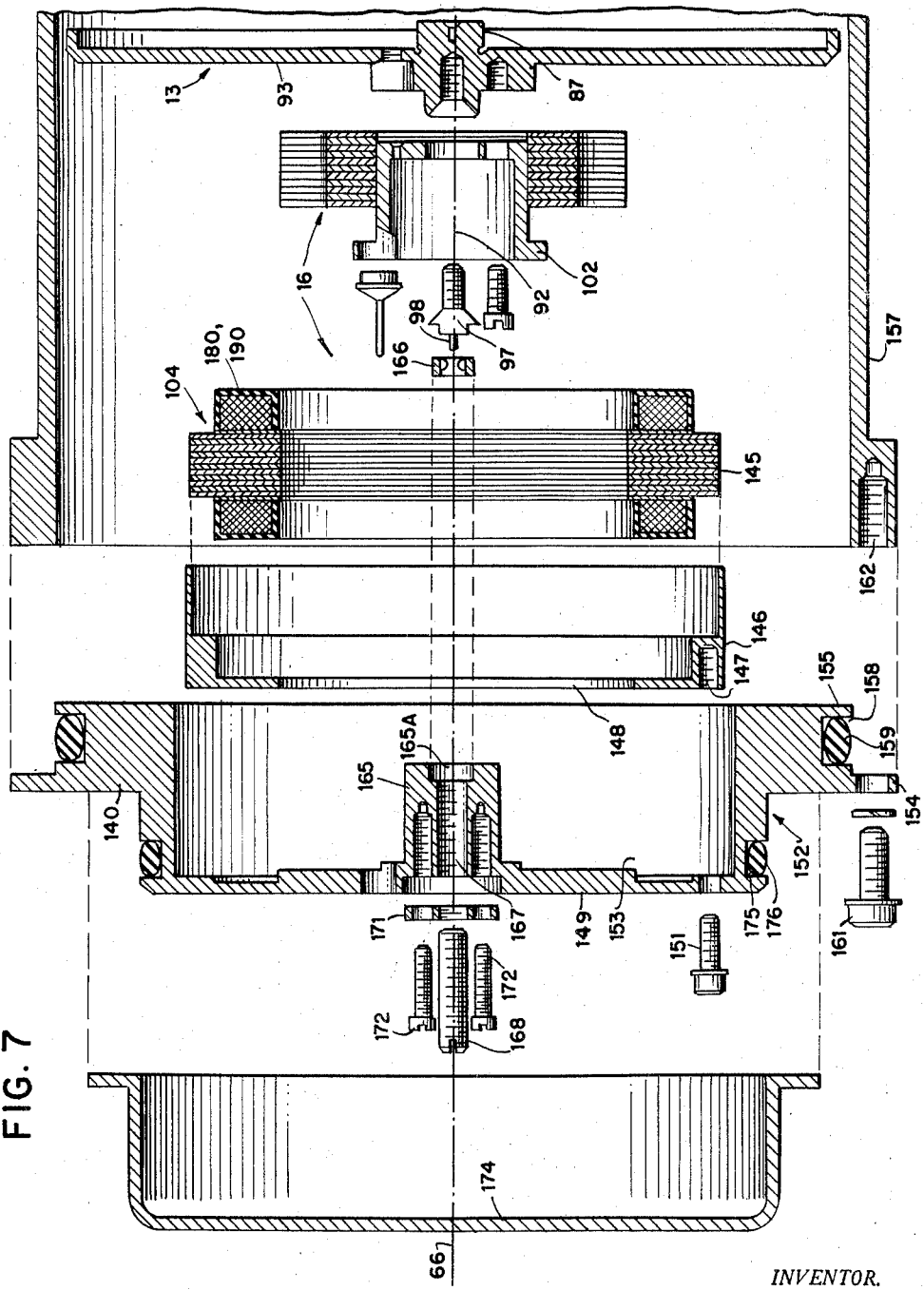
INVENTOR.
Walter J. Krupick
BY
ATTORNEY Oct. 21, 1958 W. J. KRUPICK 2,856,777
FLOATED GYRO
Filed Nov. 5, 1956 7 Sheets-Sheet 7

INVENTOR.
Walter J. Krupick
BY
ATTORNEY

United States Patent Office 2,856,777
Patented Oct. 21, 1958

2,856,777

FLOATED GYRO

Walter J. Krupick, Franklin, N. J., assignor to Kearfott Company, Inc., Little Falls, N. J., a corporation of New York Application November 5, 1956, Serial No. 620,354

13 Claims. (Cl. 74—5.4)

This invention relates to gyroscopic apparatus and particularly to a gyroscope employing a floated gyro assembly, and to be utilized as a rate gyro, with a single degree of freedom.

In the application of gyroscopes to instrumentation for use in aerial navigation systems, it is necessary to modify the intrinsic operation of the gyroscope to compensate for the variation of certain external conditions if the gyro is to provide correct guidance information. Such compensation may be introduced by the application of suitable torques to the gyro inner gimbal.

For example, it may be desired to introduce a compensating factor that will balance out the effect of earth's rotation at the gyrolocus. Such a compensating factor may be introduced by generating a signal proportional to the earth's rotation at that locus and applying the signal, properly amplified, to develop a corresponding torque on the gyro inner gimbal through a suitable torque-producing motor.

In the gyroscope disclosed herein, the torque-producing motor utilizes a permanent magnet rotor secured to and supported on the gyro inner gimbal, and a stator winding supported on the case. A signal of predetermined strength and polarity applied to the stator winding creates the torque desired to be impressed on the gimbal axis.

The torque-producing motor finds double usage in this application, first, to shift the gyro from and to selected null positions for preliminarily checking and testing the gyro, and, second, to introduce the compensating torques during normal operation.

During normal operation, ordinary friction at the inner gimbal pivots creates an apparent or spurious external torque that diminishes the accuracy of the gyroscope. To minimize such friction the gyro wheel and its motive device are supported on or in a float in a fluid, in such manner as to establish a flotation buoyancy equal to the weight of the floated assembly of the gyro wheel and its motor.

Such construction necessitates sealing of the chamber containing the floated assembly. A particular problem encountered is to balance the float after its assembly within such sealed housing, which later serves as a container and enclosure for both the fluid and the floated gyro assembly.

An extension of this problem is to provide suitable access for rebalancing the float, if necessary, after any servicing operation on the gyroscope and its associated equipment.

In view of the intended end use of this gyroscopic apparatus for airborne instrumentation and control, it is further desired to reduce the weight and volumetric dimensions to the minimum possible.

In order to control external equipment in accordance with a selected mathematical function of a precession movement of the gyro, in response to the movement of its airborne carrier, a suitable electromagnetic inductive pick-off is provided to be controlled by the gyro movement to develop an electrical signal. The signal is then used to generate such selected function.

The object of this invention is to provide a gyroscope utilizing a floated gyro, having a simple construction permitting simplicity and ease of assembly, with a minimum of frictional restraint on the gyro wheel, and with easy accessibility for adjusting the gyro wheel axis after assembly, in order to establish accurate static and dynamic balance. Further, the object is to provide a construction of minimum spacial dimensions and weight.

Another object of this invention is to provide a floated rate gyro of novel construction, in which a permanent magnet torque motor is used to apply selective torques to the inner gimbal axis to control the operation of the gyro.

Another object of the invention is to provide a floated gyro in which a gyro wheel and its spinning motor are hermetically sealed within a closed drum that is pivotally supported between two bearings in a fluid-filled space of such volumetric dimensions as to float the drum with a minimum of friction on its supporting bearings, the construction being provided with suitable adjustable balancing means to maintain the effective axis of oscillation of the drum co-axial with the mechanical axis of support for the drum.

These and other objects of the invention will be pointed out in the progress of the description set out in the accompanying specification.

The construction and the manner of operation of one form of the floated gyro, designed to embody the principles of this invention, are shown in the accompanying drawings, in which—

Figure 5 is a vertical longitudinal sectional view of the gyro motor and the float drum assembly, showing the gyro wheel and shell of Figure 4 in place, together with the respective rotor elements of the inductive pick-off and of the torque motor mounted in place on opposite end walls of the float;

Figure 6 is a partial end elevational view of the float in Figure 5, and shows the outline of the rotor of the pick-up;

Figure 7 is an exploded view of the left-hand, or pick-off, end of the apparatus;

Figure 1:
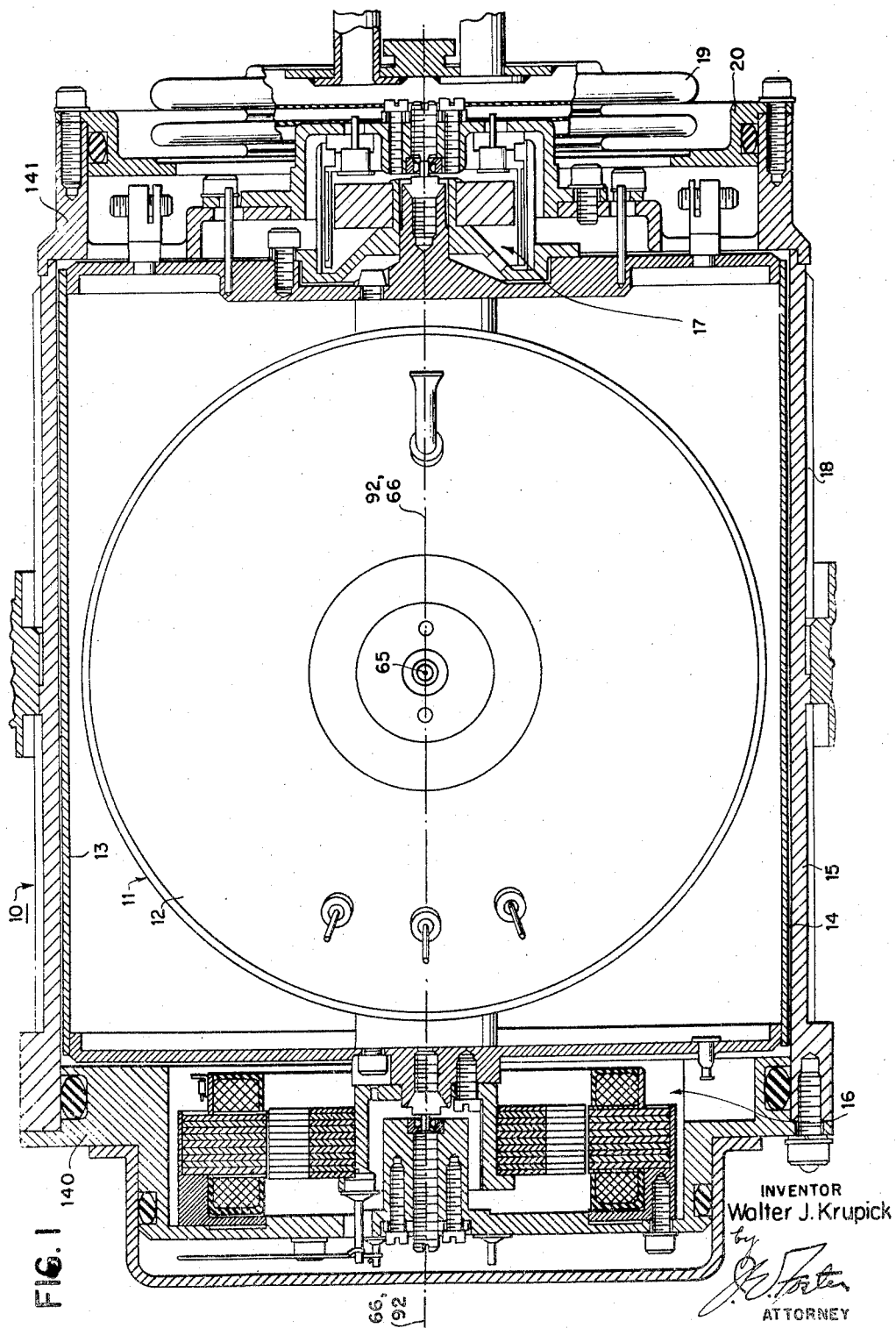
Figure 1 is a longitudinal vertical sectional view of the gyroscope.

As shown in Figure 1, a gyroscopic apparatus 10, constructed to embody the features of the present invention, comprises a gyro wheel and motor assembly 11, which is supported and enclosed in a hermetically sealed shell 12, that is in turn disposed in a hermetically sealed float drum 13, the drum being immersed and floated in a fluid 14 contained in and filling an enclosing housing 15. The float drum 13 serves as an inner gimbal for the gyro, and is mechanically supported to pivot on end walls of the housing 15.

In order to detect an angular movement of the float drum, corresponding to a precession movement of the gyro wheel assembly, an inductive pick-off device 16 is provided, disposed in a chamber at the left-hand end of the housing 15, to generate a signal for use in an external system.

A torque motor 17 is provided in a chamber at the right-hand end of the housing 15. The motor serves to apply a restoring force to the float drum, during assembly and test. Subsequently, during normal operation, the motor applies a selective torque to the gyro to compensate for selected force quantities that would affect the gyro operation at the gyro location.

The flotation supporting force for the float drum 13 is derived from the quantity of fluid 14 displaced by the weight of the drum 13. The volume of the drum is therefore made to be suitably related to the weight of the drum and its contents, so the drum and its contents will have an average density substantially equal to the density of the fluid. As a consequence, the mechanical pivotal supports for the floated drum as a gimbal experience a minimum of friction.

The flotation liquid 14 would be affected by temperature variations, and would change in volume and density. In order to maintain temperature conditions relatively constant, a wire heating element 18 is wound around the body of the housing 15 and is energized to maintain stable temperature during normal operating conditions. The resultant initial expansion of the fluid 14 to operating volume is accommodated by space made available by a compressible and expansible bellows 19 supported on the inside of a closure cap 20 at the motor end of the housing 15.

*The gyro assembly*

Figure 4:
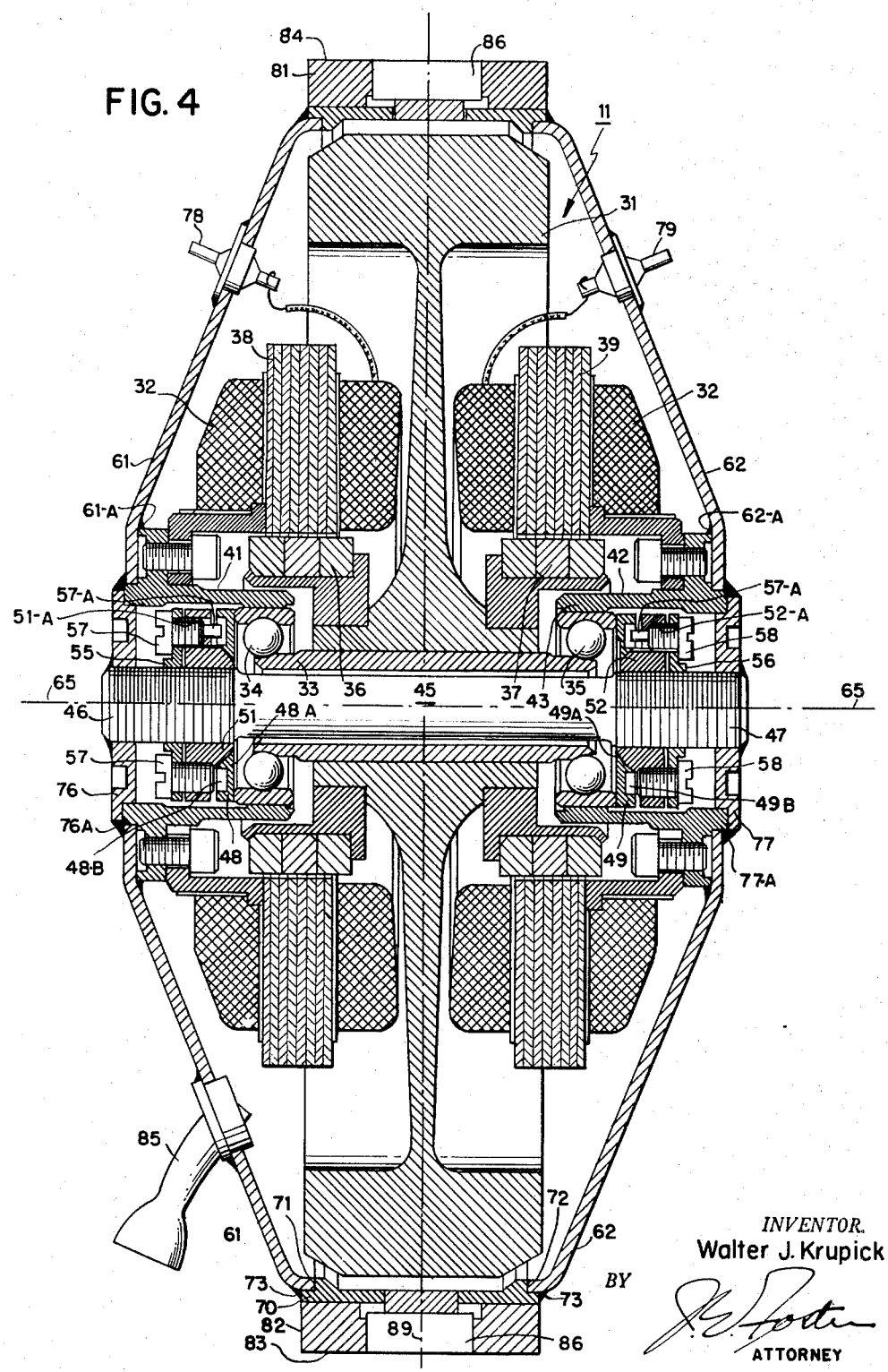
Figure 4 is a vertical axial view, partly in section and partly in elevation, of the gyro wheel and motor assembly, and shows how the gyro wheel is mounted for free rotation on a prestressed supporting structure, all of which is supported and enclosed in an evacuated hermetically sealed shell or container.

The gyro assembly 11, shown in vertical section in Figure 4, comprises, generally, a gyro wheel 31 and twin spin motors 32. The gyro wheel 31 is secured by its hub on a hollow shaft 33 supported between two co-axially aligned ball bearings 34 and 35. Also secured to the hub of gyro wheel 31 are two sets of rotor rings 36 and 37, that serve as rotors for associated stators 38 and 39 of the twin spin motors 32.

The stators of the spin motors are supported on two cylindrical co-axially aligned brackets 41 and 42, whose front inner ends embody short support pads 43 for the outer races of ball bearings 34 and 35.

The two ball bearings 34 and 35 support the rotating gyro wheel 31. To maintain operating conditions relatively constant on the wheel, the bearings 34 and 35 are pre-stressed so they will remain stressed under all conditions of expansion and contraction that will be encountered due to temperature changes in the wheel support structure.

The gyro wheel and its related supporting structural elements are all ultimately mounted on a center pin or tension strut 45, having a shank of reduced diameter and two enlarged ends provided with threaded sections 46 and 47. Those two threaded sections support the stressing means for the bearings. Two annular pressure washers 48 and 49 respectively seat co-axially against the outer edge rims of the outer races of the two bearings 34 and 35. Two spherical contour pressure discs 51 and 52 are adjustably threaded onto the threaded sections 46 and 47 of the tension strut 45 and press against the pressure surfaces 48-A and 49-A of the pressure washers 48 and 49, to develop a selectively determined appropriate compression force against the two ball bearings 34 and 35, to constitute the desired pre-stress force to compensate for temperature expansions and contractions.

The axis of the tension strut becomes essentially the axis of rotation of the gyro wheel after the assembly is completed.

The inner surfaces 48-A and 49-A of the two pressure washers 48 and 49 are conical sections, and are relatively free to adjust themselves against the spherical contour surfaces of the pressure discs 51 and 52. The result of tightening the two discs 51 and 52 onto the tension strut 45 is to position the two pressure washers 48 and 49 tightly against the two ball bearings 34 and 35 so those bearings and the balls will adjustably find their optimum positions transverse to the axis of rotation of the wheel assembly.

After the two spherical contour discs 51 and 52 are tightened to their appropriate positions, as by a spanner wrench, two lock nuts 55 and 56 are threaded onto the threaded sections 46 and 47 of the tension strut 45, and then tightened onto the contour discs 51 and 52 by lock bolts 57 and 58 into threaded openings 51-A and 52-A. The upper bolts 57 and 58 are each provided with a tip 57-A that extends through the threaded openings 51-A and 52-A of contour discs 51 and 52 into a recess 48-B or 49-B in the associated annular pressure washer 48 or 49. Each such pressure washer is provided with a selected number of such recesses, here shown as two, of which one will be used to receive the bolt tip 57-A to effectively restrain the associated washer against shifting from the optimum position to which it was adjustably moved by the stressing action of the related contour disc.

During preliminary steps of the assembly operations, the two bearing-supporting cylinders 41 and 42 are soldered to associated side walls 61 and 62 of an ultimate enclosing shell for the gyro wheel assembly. The locations of the solder seal circular areas are shown at 61-A and 62-A.

The assembling of the gyro wheel and motor parts serves to align those elements and parts co-axially and concentrically relative to the rotation axis 65 corresponding to the strut axis. The pre-stressing operation is also utilized to position the gyro wheel and rotor assembly so the median plane of the gyro wheel will be properly positioned to pass through the zero point of the coordinate axes of the completely assembled gyroscope 10, corresponding to the point of intersection of the strut axis 65 and the longitudinal axis 66 of Figure 1.

To form the enclosing shell for the gyro wheel, the two side-walls 61 and 62 are fitted into opposite ends of a ring 70 against suitably formed shoulders 71 and 72. Side-wall 61 is solder-sealed around its shoulder seat 71, and side-wall 62 is solder-sealed around the edge rim circle 73 of ring 70. Two closure discs 76 and 77 are threaded on strut sections 46 and 47, to engagement with the edges of the cylindrical bearing brackets 41 and 42, and two circular solder seals are then applied at 76-A and 77-A.

Sealed through terminals 78 and 79 supported on the side walls 61 and 62 provide connections as terminals to the stator windings of the twin motors 32.

In order to provide pivotal supports for the entire gyro assembly 11, the ring 70 is provided with two diametrically opposite axially aligned openings into which two plugs 81 and 82 are accurately fitted and brazed to seal the openings. The plugs are then accurately machined to present flat parallel surfaces 83 and 84 perpendicular to the axis defined by the two openings for the plugs 81 and 82.

After completion of the assembly, the shell is evacuated through a pinch tube 85, which is then pinched and sealed closed. The completed gyro assembly and shell 11 is now ready to be mounted in the float drum 13.

Figure 8:
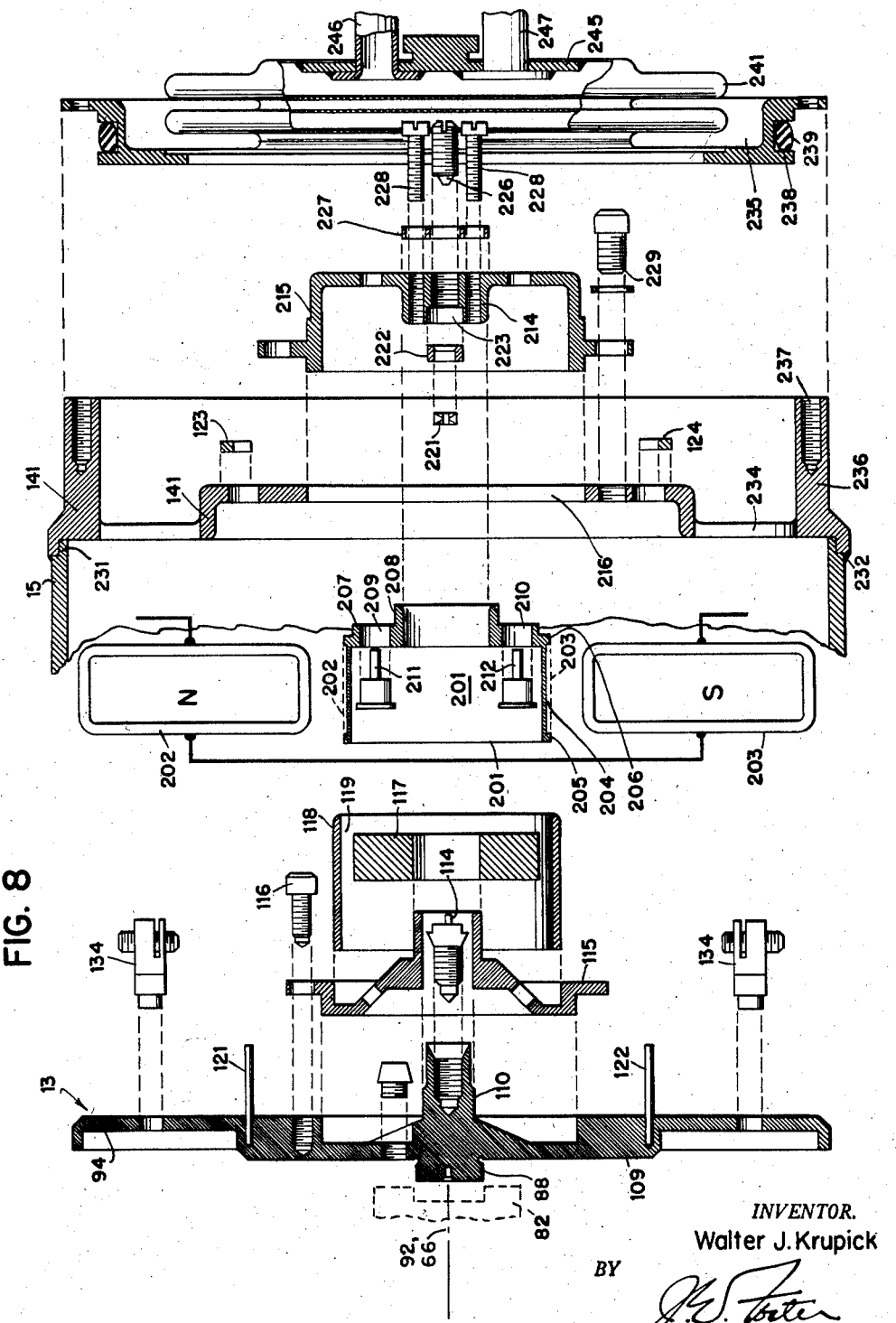
Figure 8 is an exploded view of the right-hand, or motor, end of the apparatus.

The two plugs 81 and 82 are each also provided with a concentric bore 86 on an axis 89, to fit over concentric circular guides and supporting pilot elements 87 and 88 on each respective side wall 93 and 94 of the float drum during assembly as shown in Figures 5, 7 and 8.

The float drum

As shown in Figures 1 and 5, the gyro shell 11 is supported in a hollow hermetically sealed float drum 13, consisting of a symmetrical hollow cylindrical body or shell 91, concentric about its longitudinal axis 92, and closed by two end walls 93 and 94. The shell 91 is evacuated through a pinch tube 95 and is left evacuated, or is filled with an inert heat-transfer gas, if desired. The pinch tube 95 is then pinched off and suitably sealed as by a solder tip.

The left-hand drum end wall 93 is provided with a central concentric pad with a threaded axial hole to receive a threaded adjustable screw 97 having an operating head with an axial opening to receive and hold a pin 98 to serve as a trunnion for the float drum 13. The central pad 96 provides additional strength to the end-wall 93 to receive three fastening screws 99 for holding the locating plug 81 of the gyro shell 11 secured to the drum end-wall 93.

The central pad 96 on drum end-wall 93 also has a central co-axial outboard projection 101 to serve as a seat for a bracket 102 whose function is to support the armature 103 of the electromagnetic inductive signal device 16. The armature 103 consists of a plurality of stampings or laminations of high-permeability steel having several polar portions 103–A that serve as individual armatures or vanes to establish magnetic balance between adjacent teeth, in pairs, of the stator 104 of the inductive device 16, as shown in detail in Figures 1, 6 and 7. While the vanes are in such neutral or null symmetrical positions, no signal or minimum signal is generated by the pick-off. When the vanes are moved from such neutral or null positions, signal voltages are generated in the output winding of the pick-off 16.

The right-hand drum end-wall 94 is also provided with a concentric thickened section or pad 109 having a central co-axially extending outboard projection 110 with a threaded axial hole 111 to receive a threaded adjustable screw 112 arranged to receive and hold a pin 114 to serve as the second trunnion for the float drum 13.

The outboard support 110 also serves as an anchoring seat for a supporting bracket 115 that registers with the outer surface of drum end-wall 94 and is secured to the pad 109 by suitable screws 116. The bracket 115 serves to support a permanent magnet 117 and a cylindrical keeper 118 as a return path for the magnet 117 that serves as the rotor of the torque motor 17. The keeper 118 is spaced from the magnet 117 by a short space 119 that serves as an air gap to accommodate a stator 104, to be described below, that co-operates with the magnet 117 to constitute the torque motor 17 to restore the float drum 13 to a null position, after any precession movement of the gyro and the drum from such null position, and upon energization of the torque motor from an external control circuit, or to apply a measured torque to the drum to introduce a selective control factor for controlling the operation of the gyro.

Figure 3:
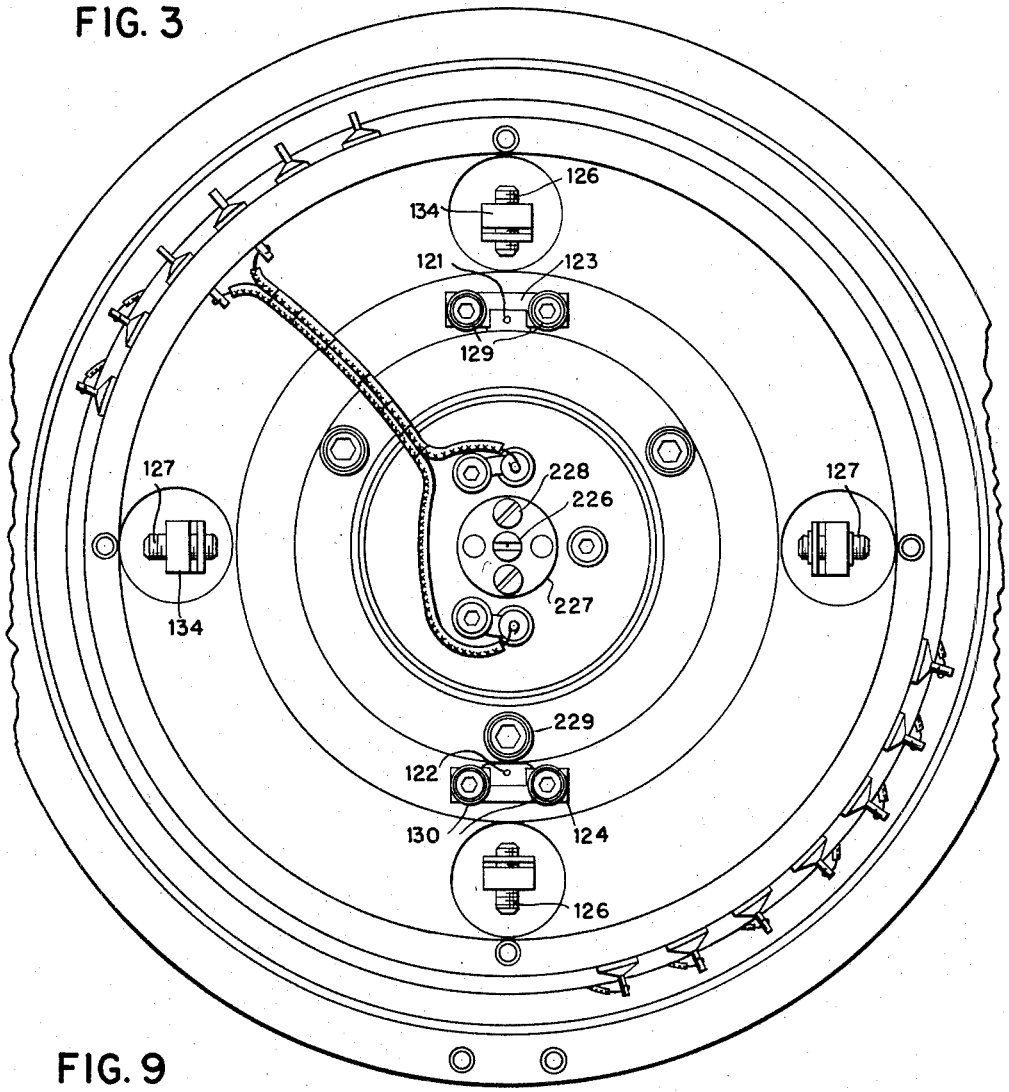
Figure 3 is an end view in elevation of the right-hand end of Figure 1 which is the torque motor end.

In order to limit the angle of departure of the float drum 13, during any precession, two stop pins 121 and 122 are anchored in the pad 109, on the right-hand wall, and they extend axially outward sufficiently to engage two stop brackets 123 and 124, shown in Figures 3 and 8.

For proper functioning of the float drum 13, it is arranged to be mechanically balanced about its axis 92. Two pairs of threaded screw weights 126 and 127 are adjustably supported on anchored brackets 126–A and 127–A, disposed on end-wall 94 and equidistantly spaced from the drum axis 92, on co-ordinate axes, for example, the transverse vertical and the horizontal axes through the longitudinal axis 92. When the float drum 13 is properly balanced, its operating axis should co-incide with its physical axis 92. The operating axis should then also co-incide with the physical axis 66 of the completely assembled gyro, as in Figure 1.

During the process of assembling the float drum 13 and the various elements attached to, and supported on, its end-walls the drum 13 may be evacuated, as previously mentioned, and a low pressure inert gas substituted in the evacuated space in the drum. A plug screw 129 is shown in the end-wall 94, and, together with the pinch tube 95 in the opposite end-wall 93, enables the evacuation and the refilling operations to be performed.

The float drum 13 after being assembled, according to Figure 5, is ready for flotation and for placement between the bearings on the two end walls 140 and 141 of the housing 15, as shown in Figure 1.

The manner of assembly of the float drum 13 with pick-off 16 and housing end-wall 140 is indicated in some detail in the exploded view of Figure 7. Similarly, the assembly of drum 13 with torque motor 17 and the right-hand end-wall 141 is shown in the exploded view of Figure 8.

Figure 6 shows the contour of the rotor 103 of the inductive signal pick-off 16, whereby several pole elements or vanes 103–A serve as magnetic balancing bridges across associated pairs of stator teeth to generate a signal when a precession of the gyro rotates the rotor 103 to unbalance the magnetic bridging effect of each vane 103–A. The balanced arrangement of the rotor vanes limits any possible electromagnetic force reaction between the rotor and the stator's teeth when the rotor is shifted.

Figure 10:
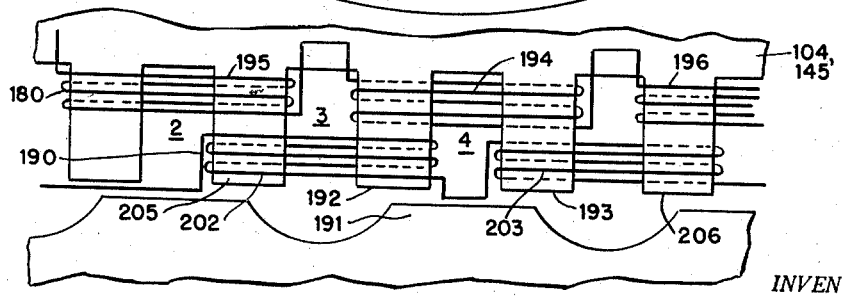
Figure 10 is a simple schematic diagram of portions of the primary winding and of the secondary winding on the stator core of the pick-off inductive signal generator, to show the overlapping disposition of the coils of the two windings.

The circuit arrangement for one vane and tooth magnetic circuit is shown in Figure 10, and is explained below, in connection with the description of the pick-off 16.

The inductive signal pick-off

As shown in Figures 5, 6 and 7 the rotor 103 and stator 104 of the signal pick-off 16 are supported concentrically about the axis 92 of the gyro float drum 13, corresponding to main axis 66. The rotor 103 is supported on the float drum 13 and both the float and the stator 104 are supported on the housing wall 140. The rotor 103 consists of a stack of high-permeability laminations on the bracket 102. Each polar vane 103–A bridges a pair of stator teeth, as shown in Figure 10. The rotor 103 is initially positioned to be in neutral position when the float drum 13 is in neutral position, corresponding to gyro neutral position. The elements of the rotor assembly, shown in Figures 5 and 6, are similarly identified in Figure 7. The stator and the housing elements are additionally shown in Figure 7, to complete the assembly of the pick-off 16.

The stator 104 comprises a stack of annular laminations 145, to be physically and concentrically supported in a mounting ring 146 that is provided with bolt-receiving holes 147 and with a concentric axial window 148 to enable the ring 146 to be concentrically mounted on and within the housing end-wall 140. The end-wall 140 embodies a pad 149 to serve as a locating and positioning seat for the window opening 148 of supporting ring 146. Bolts 151 then serve to lock the ring 146 in fixed position on the housing end wall 140.

The housing end-wall 140 is part of an end cap 152 provided with a pocket 153 to receive the stator 145 and its supporting ring 146. The end cap 152 also embodies an encircling annular registration ring 154 and an annular guide ring 155 that serve to position the end cap concentrically within and on the housing body 157, to maintain the pick-off signal stator concentric about the main longitudinal axis 66 of the complete apparatus. The end cap 152 serves to define and locate one bearing point for the locus of the main axis 66.

The space between the registration ring 154 and the guide ring 155 constitutes a peripheral groove 158 to retain a sealing O-ring 159 of resilient compressible material to seal off the end of the housing when the end cap 152 is pressed into closing position on the housing body 157. The end cap 152 may then be bolted closed on the housing body 157 by suitable bolts and washers 161 threaded into bolt holes 162 in thickened portions of the housing body 157. The flotation liquid is thus retained against leakage from the housing.

To define the axis location at the end cap 152, the end cap 152 is provided with an inwardly extending concentric hub 165 having a co-axial pocket 165-A for receiving and supporting a jewel bearing 166 to support the trunnion pin 98 of end wall 93 of the gyro float drum 13.

The hub 165 also has a threaded hole 167, behind the pocket 165-A to receive an adjustable screw 168, that is axially movable to engage the trunnion pin 98 and to impress a pushing force on the pin to adjustably shift the float drum 13 a short distance axially to proper operating position between the two bearings for the float drum 13. A lock washer 171 and two lock bolts 172 hold the adjustable screw 168 fixed against displacement in response to any frictional action of the trunnion pins during precession angular movement of the float drum 13. A cover 174 is provided to fit over and protect the end-wall 140 from dust and dirt. A peripheral groove 175 behind and along the rim of the housing end-wall 140 accommodates an O-ring 176 to provide such dust and dirt seal in cooperation with the cover 174.

Reverting to the pick-off signal unit 16, itself, the rotor 103 and the stator laminations 145 are shown in outline in relative operating position for zero or null signal. The rotor core 103 is shown with six poles or vanes. The rotor core 103 is shown with each pole or vane 103-A straddling one of the odd-numbered slots of the stator core and each cavity 103-B between the poles or vanes is positioned to straddle one of the even-numbered slots of the laminated core 145 of the stator 104.

The stator core 145 carries a primary winding 180 and a secondary winding 190. Each winding consists of six series connected coils.

Each coil of the primary winding 180 is around two adjacent teeth, in successive pairs, or considered in another way each successive coil is laid in odd-numbered slots, with each successive coil wound to develop an alternately opposite magnetic polarity at the tooth faces of the associated encircled pair of teeth within the coils.

Similarly, each coil of the secondary winding 190 is wound around two adjacent teeth, in successive pairs, shifted one tooth, either way, from the primary winding disposition. These secondary coils are thus laid in even-numbered slots.

The arrangement of the primary and secondary windings on the stator core, and the relative position of the rotor, are shown schematically in Figure 10. A part of the stator core 145 is shown developed, with the coils of the primary winding 180 in place in odd-numbered slots, only three coils being shown, as sufficient to explain the operation. The coils of the secondary winding 190 are shifted one slot pitch, to occupy even-numbered slots. The rotor 103 is shown in its neutral or null position, with one vane 191 straddling the slot 4 between the two teeth 192 and 193. In such null position, each vane covers an equal dimension of the tooth face from its edge at the slot.

One coil 194 of primary winding 180 encircles the two teeth 192 and 193 and magnetizes them both with the same instantaneous polarity. The two adjoining coils 195 and 196 separately encircle their respective associated pair of teeth and energize both teeth of each such pair with a magnetic polarity instantaneously opposite to that of teeth 192 and 193.

The successive coils 202 and 203 of the secondary winding 190 are each also wound around two adjacent teeth, but shifted one slot pitch from the primary coils. Thus, secondary coil 202 encircles tooth 192 and tooth 205 on its left-hand side; secondary coil 203 encircles tooth 193 and tooth 206 on its right-hand side. As previously mentioned, vane 191, of the rotor 103, is in normally balanced position between teeth 192 and 193 when the float drum is in neutral or zero position. The inductive effects of primary coil 194 on both secondary coils 192 and 193 are substantially equal and balanced, leaving the net voltage induced in those two secondary coils by primary coil 192 equal to zero.

Similarly, each other vane of the rotor is balanced between each pair of two adjacent teeth encircled by one coil of the primary winding. And, similarly, the turns of the secondary coils on each tooth of such pair, are equally excited while the associated vane is in neutral or balanced position.

All the secondary coils are connected in series, but successive coils are wound in opposite senses, similar to the successive primary coils. The voltages induced in the six secondary coils are thus additive whenever the rotor angularly shifts from zero or null position. The voltage thus derived in the secondary winding serves to indicate the direction of precession of the gyro, and may be utilized in an external circuit for any desired operation, such as, for example, restoring the gyro to null position as part of a control or measurement function. The restoration of the gyro to neutral position will be accomplished by the torque motor, which will now be considered.

*The torque motor*

The construction and manner of assembly of the torque motor 17 are shown in the exploded view of Figure 8, which includes the rotor elements of the assembly on the right-hand side of Figure 5, identified by the same numerals as in Figure 5, and includes additionally the stator elements of the torque motor 17.

The pad 109 on the end wall 94 of the float drum 13 is shown in Figure 8 with the concentric guide and seating pilot 88 to guide, to position and to support the plug 82 of the gyro shell ring 70 on the inner side of the float drum wall 94.

The rotor elements of the torque motor 17 are supported from the float drum wall 94 as shown in Figure 5, the manner of assembly being indicated in Figure 8.

The stator elements of torque motor 17 are supported from the housing right-hand end wall 141. Those stator elements include a thin cylindrical shell 201 and a polarizing stator winding of two flat pan-cake coils 202 and 203 peripherally disposed on shell 201 in a shallow peripheral recess 204 between two concentric axially spaced peripheral rings or ridges 205 and 206.

The front end of the stator shell 201 extends into the air-gap space 119 adjacent the permanent magnet 117 of the rotor. The back end of the shell 201 constitutes an annular support wall 207 terminating in a concentric hub 208. The annular wall 207 is provided with two openings 209 and 210 to receive two sealing through-pins 211 and 212 to serve as sealed terminals for the stator winding, and to be accessible through the housing wall after assembly. The hub 208 of the stator shell seats on a circular pilot shoulder 214 formed on a cover shell 215 that fits into and closes a window 216 in the housing wall 141. The stator is thus supported on housing wall 141 to be concentric with main axis 66 of the gyro.

The two coils 202 and 203 of the stator winding are energized to be oppositely polarized. They may be connected in series, as shown, and energized from an external source of direct current, so each coil will develop a magnetic polarity opposite to that of the permanent magnet pole face of the magnet 117 directly beneath the coil. The field developed by each coil when energized will attract its associated magnet to develop a torque for control purposes in the system in which the gyro is used.

The two stator coils 202 and 203 are wound as single-layer flat pancake coils, and, when folded on the cylinder 201, are cemented to lay in the space 204 below the top levels of the rims 205 and 206 as shown by dotted lines 202 and 203, to avoid mechanical interference with the rotor cylinder 118 on the float drum 13.

As previously described, the trunnion pin 114 is supported in a jewel bearing 221, seated in bracket 222 which is fitted into a pocket 223 in the circular pilot 214. A threaded adjustment screw 226 is axially adjustable in the pilot body 214 to shift the jewel bearing 221 and the trunnion pin 114 to position the float drum 13 in appropriate axial position between the two housing walls 140 and 141. A locking plate 227 and two anchoring bolts 228 hold the adjustment screw against displacement from a selected adjusted position in response to recurring precession movements of the float drum.

The cover shell 215 is anchored on the housing wall 141 by suitable lock washer and bolt combinations 229.

The angular motion of the float drum during precession is limited by the pins 121 and 122 engaging the side walls defining a free space in each of two associated stops 123 and 124, suitably anchored on the housing end-wall 141.

The housing end-wall 141 is assembled on the housing shell 15 to seat on a shoulder 231 as shown in Figure 8, and a peripheral solder seal joint 232 is formed to seal and lock the end-wall on the body shell 15. The end-wall 141 is provided with four openings or windows 234 through which the adjustable balance weight screws 126 may project, to be accessible after the housing wall 141 is assembled on its body shell 15, with the float drum 13 within the housing.

The flotation fluid 14 is now to be placed in the housing, and a sealing end-cap 235 is therefore applied over the open end of the end-wall 141. The end wall 141 has a thickened wall ring 236 with bolt holes 237 to receive suitable locking bolts to secure the end-cap 235 to the end wall 141.

Figure 9:
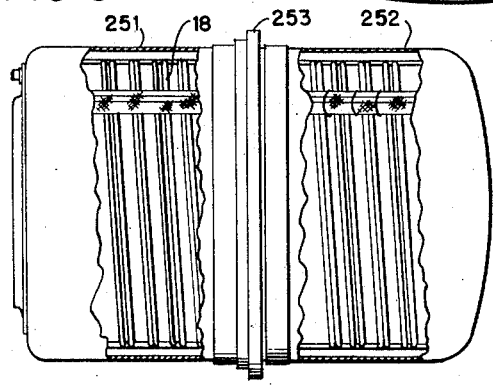
Figure 9 is a side elevational view of the covered gyro, with portions of the cover broken away to expose the heating element that is to keep the temperature of the device constant.

The end-cap 235 has a concentric guide ring 238 that slide fits into the housing wall ring 236, with a sealing O-ring 239 disposed to wipe against the inner surface of the wall ring 236 to establish a retaining seal for the fluid to be inserted in the housing. An expansible bellows 241 provides expansion space for the fluid when the fluid is heated to a predetermined operating temperature by the coiled heating element 18 encircling the housing body, as shown in Figures 1 and 9.

The bellows 241 has an outer wall 245 hermetically sealed and having an inlet tube 246 and an outlet tube 247 secured thereto for access to fill the housing with the flotation fluid. After such filling operation, to exclude all air from the body, the two tubes 246 and 247 are pinched closed and sealed.

Two outer cover shells 251 and 252 are separately applied over the respective ends of the assembled gyro, and fitted onto appropriate seating shoulders on a mounting flange 253 on the housing body shell 15. The mounting flange enables the gyro to be suitably mounted on any external base.

Figure 2:
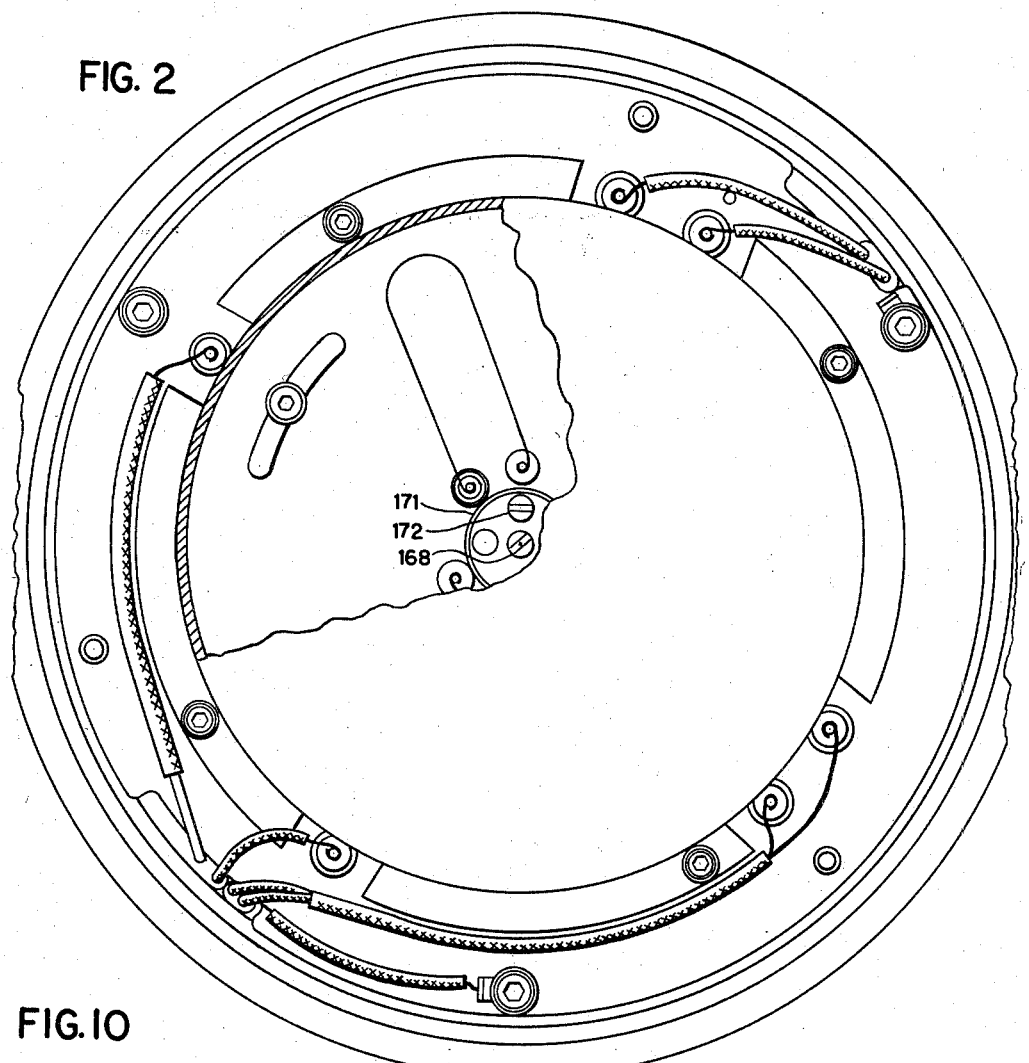
Figure 2 is an end view in elevation of the left-hand end of the structure in Figure 1 and corresponds to the take-off end, with a portion of the cover broken away.

The end elevation shown in Figure 2 shows the manner in which some of the terminals are disposed as sealed through circuit wiring terminals to maintain the hermetic sealed condition within housing, by providing terminals for external connections to circuits or windings within the housing.

The details of the specific connections are not necessary to the understanding of the invention which has been adequately described in function and in the details of construction.

Obviously the structural details might be varied without departing from the spirit and scope of the invention as described and set out.

What is claimed is:

1. A floating gyro comprising a gyro wheel and a supporting axle therefor; an enclosing shell for the gyro wheel and axle; a cylindrical drum enclosing the shell, said drum having two axially spaced end-walls with an axial trunnion on each end wall; a housing having a cylindrical body concentrically surrounding the drum and closed by two end walls and being filled with a liquid to float the drum; co-axial bearings supported on end-walls of the housing and serving to retain the trunnions of the cylindrical drum in predetermined co-axial alignment with the axis between said bearings; means, on the end walls of the housing for co-axially supporting the bearings, and a torque motor comprising a rotor element and a stator element, one element being supported on the trunnion and the other element on the supporting means for the associated bearing.

2. A floated gyro, as in claim 1, in which the rotor includes one pair of permanent magnet poles disposed radially in diametrically opposite directions, and a cylinder of magnetizable material coaxially supported on the trunnion to serve as a flux-return path for the permanent magnet poles and said cylinder encircling the permanent magnets at a radius slightly beyond the end faces of the permanent magnet poles to define an air-gap space to accommodate the stator of the motor.

3. A floated gyro, as in claim 2, in which the stator includes a cylindrical bracket having a seating portion fitting on a supporting portion of the housing end-wall, and said cylindrical bracket having a cylindrical support extending axially into the air gap between the permanent magnet faces and the flux-return cylinder of the rotor; and a pair of pancake-shaped coils on the cylindrical support of the bracket to establish opposite magnetic poles, when energized, thereby to act upon the permanent magnets to restore the permanent magnets to predetermined relative positions adjacent the coils, in order to restore the gyro drum to a neutral or null position after a precession away from neutral position.

4. A floated gyro, as in claim 3, in which the drum is provided with adjustable weights diametrically disposed on co-ordinate axes transverse to the main axis of rotation of the drum, whereby the drum is balanced about said main axis to minimize the development of force couples about said axis that could cause precession of the gyro.

5. A gyroscopic apparatus comprising a motor having a rotor supported on a shaft to serve also as a gyro axle; a gyro wheel on said axle; a closed hollow cylindrical drum concentric with its axis and enclosing and supporting said motor and gyro wheel in a hermetically sealed atmosphere, said drum having two end walls to close the drum; a trunnion secured to and supported on each respective wall co-axially with said axis; a housing enclosing the shell and containing a liquid filling the housing and immersing the shell to provide a displacement supporting force substantially equal to the weight of the shell and its contents, the relative dimensions of the drum and of the housing being such as to reduce the liquid to film thickness between the drum and the housing, thereby permitting the housing to be made of minimum volume, said housing having a cylindrical body and end-walls supported from the body, each end-wall having a co-axial hub thereon; bearing means co-axially supported on each end wall to receive and support a trunnion of the drum; and means for controlling the angular position of the drum to restore the drum to predetermined neutral or null position after angular movement of the drum following a precession movement of the gyro wheel, said control means consisting of a torque motor having a rotor structure co-axially secured to one end wall of the drum and carrying one magnet with a pair of permanent magnet poles disposed to be radially effective with a concentric flux-return keeper ring also supported on the rotor structure, the keeper ring being spaced radially from the outer ends of the permanent magnets to define an air gap, said torque motor also having a stator structure supported from the hub on the adjacent end-wall of the housing, said stator structure consisting of a thin cylinder supporting two pancake shaped coils, all disposed within the space of the air gap between the permanent magnet poles and the keeper ring.

6. A floated gyroscopic apparatus as in claim 5, comprising, further, stop pins mounted on one end-wall of the drum and extending between limit stops on the housing end-wall to limit the extent of angular movement of the drum in response to precession of the gyro wheel.

7. A floated gyroscopic apparatus as in claim 5, comprising, further, weighting means for adjustably balancing the drum about its axis, said weighting means consisting of paired brackets secured to one drum end-wall and diametrically disposed relative to the axis, and a threaded screw radially adjustable on each bracket.

8. A floated gyro comprising a gyro wheel and an operating motor symmetrically supported about a first axis and enclosed in a shell; a hermetically sealed drum, having a body symmetrical about a longitudinal main axis, and enclosing the shell and supporting said shell with said first axis transverse to the longitudinal drum axis to establish a zero co-ordinate point at the intersection of said two axes, said drum having two end walls at the respective ends of the drum body, and a co-axial trunnion on each end wall; a housing enclosing the drum and comprising a cylindrical body encircling and disposed concentric with the drum body and having two end walls on the body to close the housing; bearings to support the respective trunnions of the drum; means on said housing end walls to support the bearings; a liquid filling the housing and immersing the drum and providing a buoyancy force substantially equal to the weight of the drum and its contents, the dimensions of the drum being such as to equate its average density to the average density of the liquid, to thereby minimize friction between the trunnions and the bearings, and the diameter of the housing being a minimum to encircle the drum, thereby confining the intervening liquid to film thickness; adjustable weighting means supported on one end wall of the drum for balancing the drum to locate the center of gravity of the drum axis on the axis defined by the bearings on the housing; and a torque motor supported on and between the trunnion and the supporting means for the associated bearing at one end-wall of drum and housing, to apply a selective directional torque to the drum, the torque motor comprising a rotor and a stator, the rotor consisting of a permanent magnet and a keeper element spaced therefrom by an air gap, and the stator consisting of a pancake coil arcuately bent to fit into said air gap of the rotor.

9. A gyroscopic apparatus having a main axis, and comprising a gyro wheel; a motor to spin the gyro wheel; a hollow cylindrical shell having a longitudinal axis and enclosing the gyro wheel and the spin motor, and having two co-axial trunnions for pivotally supporting the shell about its axis; a hollow housing for accommodating the shell and its contents, said housing including end walls respectively provided with co-axial supporting hub elements defining the locus of the main axis; co-axial bearing means in the two hub elements for supporting the two co-axial trunnions of the shell; a liquid filling the housing and immersing the shell to provide a displacement supporting force substantially equal to the weight of the shell and its contents, the liquid being of film thickness between the shell and the housing to permit the housing to be of minimum volume to enclose the shell; and co-axial electro-dynamic torquing means including a rotor element secured to the hub element for one trunnion on the shell and a stator element co-axially supported on the hub of the adjacent end wall of the housing.

10. A floated gyro as in claim 9, in which the co-axial hubs on the housing end-walls are axially hollow to receive and support said bearing means for said trunnions, the gyro further comprising a co-axial ring of magnetic material on one end wall of the shell and disposed to extend axially relative to the juxtaposed trunnion and to extend into the hub of the adjacent end wall of the housing, said ring concentrically encircling the rotor element to serve as a magnetic return path for flux from the rotor element.

11. A gyro as in claim 10, comprising further, stop means for limiting angular motion of the shell about the main axis through the trunnions and hubs.

12. A gyro as in claim 10, in which the rotor element embodies a permanent magnet structure shaped to present a pair of salient magnetic poles transverse to the main axis, and spaced from the magnetic ring to define a cylindrical air gap to accommodate the stator element.

13. A gyro as in claim 12, in which the stator element consists of a thin cylindrical support and a pair of pancake coils arcuately curved and seated closely on said cylindrical support to enable the stator element to fit into and move freely in the air gap between the magnet structure and the magnetic ring of the rotor.

References Cited in the file of this patent

UNITED STATES PATENTS

| | | |
|---|---|---|
| 2,478,956 | Webber | Aug. 16, 1949 |
| 2,700,739 | Orlando | Jan. 25, 1955 |
| 2,731,836 | Wendt | Jan. 24, 1956 |
| 2,752,791 | Jarosh et al. | July 3, 1956 |
| 2,780,940 | Brown | Feb. 12, 1957 |